July 21, 1925.
C. L. COOK
1,546,623
PISTON RING
Filed Jan. 9, 1922
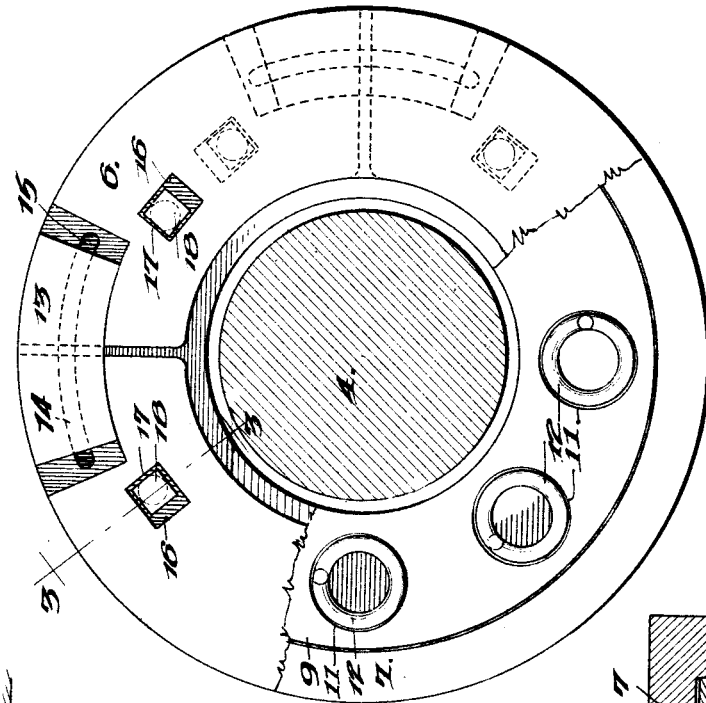
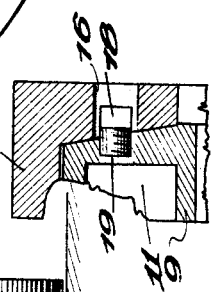
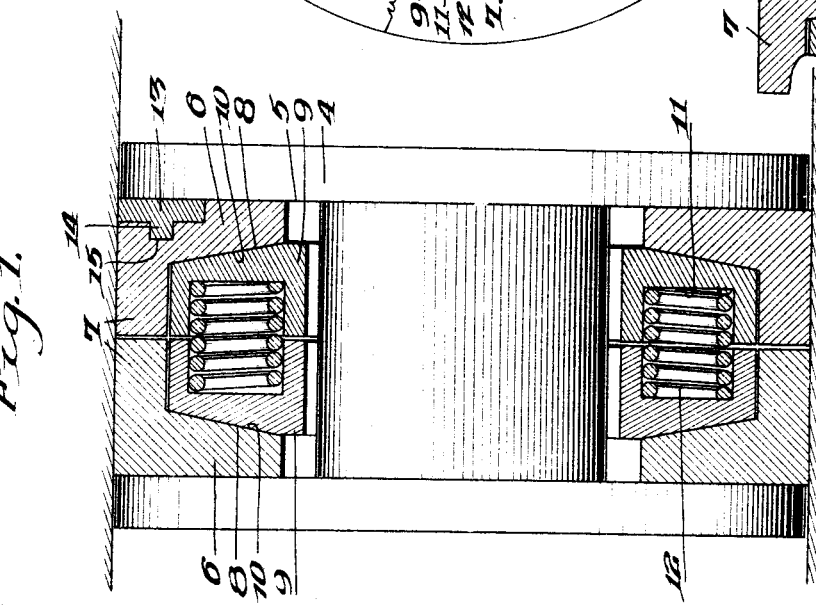
Inventor
C. Lee Cook, Patented July 21, 1925.

1,546,623

UNITED STATES PATENT OFFICE.

CHARLES LEE COOK, OF LOUISVILLE, KENTUCKY, ASSIGNOR TO C. LEE COOK MANUFACTURING COMPANY, OF LOUISVILLE, KENTUCKY, A CORPORATION OF KENTUCKY.

PISTON RING.

Application filed January 9, 1922. Serial No. 528,081.

*To all whom it may concern:*

Be it known that I, CHARLES LEE COOK, a citizen of the United States, residing at Louisville, in the county of Jefferson and State of Kentucky, have invented certain new and useful Improvements in Piston Rings, of which the following is a specification.

The present invention relates to piston packing rings, the object being to provide a structure that is effective for preventing the passage of the actuating fluid past the piston, and is also so constructed that undue pressure against the cylinder walls with consequent excessive wear is eliminated.

The preferred embodiment of the invention is illustrated in the accompanying drawings, wherein:—

Figure 1 is a side elevation of a piston body with the improved piston ring therein and illustrated in section, Figure 2 is a cross sectional view, Figure 3 is a detail sectional view on the line 3—3 of Figure 2.

In the embodiment disclosed the piston body is illustrated in a somewhat diagrammatic manner at 4, and is provided with the usual annular groove in which the piston ring is located.

This piston ring consists of two expansible split packing ring sections 6 having their outer or peripheral portions provided with coacting flanges 7 forming recesses, the inner wall faces of these recesses being oppositely inclined, as illustrated at 8. In the recesses are located wedge rings 9 having inclined faces 10 that bear against the faces 8. These rings have their opposing portions provided with pockets, as illustrated at 11, and in said pockets are located coiled springs 12 that serve to urge the wedge rings 9 apart. Obviously therefore this movement and the inclined faces 8 and 10 will effect the expansion of the ring sections 7 against the cylinder walls.

In order to prevent the actuating fluid having access through the joints of the ring segments 6 and thus entering behind the packing ring, bridge pieces 13 extend across the joints and are provided with curved flanges 14 operating in grooves 15 formed in the ends of the ring segments. The bridge pieces 13 have their outer faces flush with the faces of the ring sections as will be clear by reference to Figure 1. The end portions of the ring segments 6 are furthermore provided with sockets or openings 16, the inner walls 17 of which constitute abutment shoulders. In these sockets are located the heads 18 of screws 19 that are threaded into the wedge rings 9. It will be noted that opposite side faces of the said heads are located at different distances from the axis of the screws.

It has been found particularly in marine practice that the ideal piston ring should reciprocate with a minimum amount of tension against the walls of the cylinder consistent with steam-tight contact, and that if this principle is not maintained the packing ring is subject to abnormal wear and hence short life. In the present structure provision is made to insure the desired automatic expansion, but this expansion is limited by the stop heads 18 coming into contact with the abutment shoulders and end walls 17 of the openings 16. In actual practice the space between the heads 18 and shoulders 17 is relatively small, but it enables the packing ring to wear against the walls of the cylinder until all the surfaces are absolutely perfect, and until the space between the shoulders and heads is consumed. The packing ring can then expand no further outwardly and becomes in effect a solid ring that will run indefinitely. When, however, there are signs of leak, the screws may be turned to bring other side faces of the heads into coacting relation with the stops to provide small additional amounts of space, which allow for further expansion and thus repeat the process above described. Or if desired, the heads may be dressed down to allow for this additional space. The heads 18, it will be noted, are spaced a greater distance from the rear walls of the sockets 16 which permits the rings to spring inward or collapse, in the event of undue expansion from heat or passing over some foreign substance in the cylinder which occasionally will enter the same.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim as new, and desire to secure by Letters Patent, is:—

1. A packing ring for pistons comprising a pair of oppositely faced split ring sections having inner opposing oppositely inclined faces, wedge rings interposed between the ring sections and having inclined faces bearing against the inclined faces thereof, the end portions of the split ring sections having recesses, bridge pieces in the recesses extending across the joints between the ends of the rings and seated in the recesses, said split rings having transverse sockets therein outside the recesses, and stop lugs engaged in said recesses, permitting limited expansion of the rings.

2. A packing ring for pistons comprising a pair of oppositely faced split ring sections having opposing oppositely inclined faces, wedge rings interposed between the ring sections and having inclined faces bearing against the inclined faces thereof, springs interposed between the wedge rings, the ends of each of the split ring sections having sockets opening through their inclined faces, and stop shoulders projecting from the outer inclined faces of each of the wedge rings, said shoulders being located in the sockets of the adjacent rings and limiting the expansion of the split ring sections.

3. A split expansible ring member, a bridge member across the joint thereof for limiting the expansion of said ring member, said ring member being freely expansible with respect to the bridge member, and a stop means interlocking the bridge member and ring member for limiting the relative movement thereof, said stop being adjustably mounted on one of the members and movable with respect to the other members to vary the amount of expansion allowed to the ring member.

4. A split expansible piston ring having stop shoulders on opposite sides of the split, and rotatable stops having faces disposed eccentrically to their axes of rotation, the different faces being adapted to be brought into coaction with the stop shoulders.

In testimony whereof, I affix my signature in the presence of two witnesses.

CHARLES LEE COOK.

Witnesses:
 ROBT. C. BALDWIN,
 ARTHUR G. ROSENBAUM.